July 19, 1932.  J. BAER  1,867,996
PORTABLE FERRIS WHEEL
Filed Dec. 23, 1931   2 Sheets-Sheet 1

July 19, 1932.  J. BAER  1,867,996
PORTABLE FERRIS WHEEL
Filed Dec. 23, 1931   2 Sheets-Sheet 2

INVENTOR.
Julius Baer
BY Max D. Ordmann
ATTORNEY.

Patented July 19, 1932

1,867,996

UNITED STATES PATENT OFFICE

JULIUS BAER, OF NEW YORK, N. Y.

PORTABLE FERRIS WHEEL

Application filed December 23, 1931. Serial No. 582,674.

This invention relates to an amusement device, particularly a portable Ferris wheel and has for its main object to provide a Ferris wheel mounted on a motor vehicle and so constructed that the different gondolas while rotating with the wheel will be caused to individually move so as to always positively retain their horizontal position irrespective of the load distribution.

Another object is to provide a gondola with a passenger holding compartment which will be caused to rotate upon itself on a vertical axis while it rotates with the Ferris wheel about a horizontal axis.

A further object of my invention is to provide suitable means whereby the rotation of the Ferris wheel as well as rotation of the individual gondolas and that of the passenger holding compartments can be transmitted from the motor of the vehicle.

With these and other objects in view my invention consists in the novel combination, construction and arrangement of parts as will be hereinafter more fully described, shown and defined in the appended claims.

In the accompanying drawings which form part of this specification and in which similar reference characters denote corresponding parts:—

Figure 1:
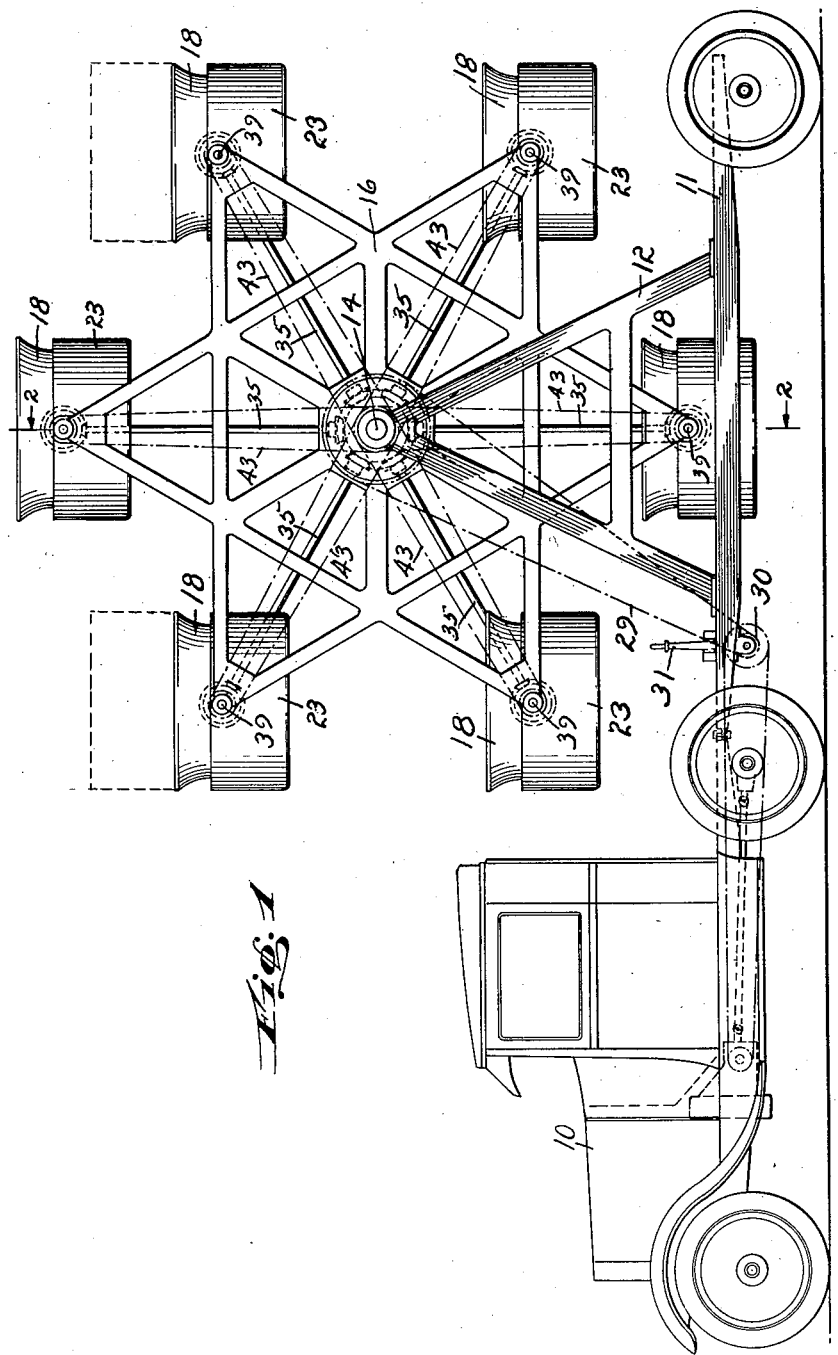
Fig. 1 is a side elevation of my amusement device.
Figure 2:
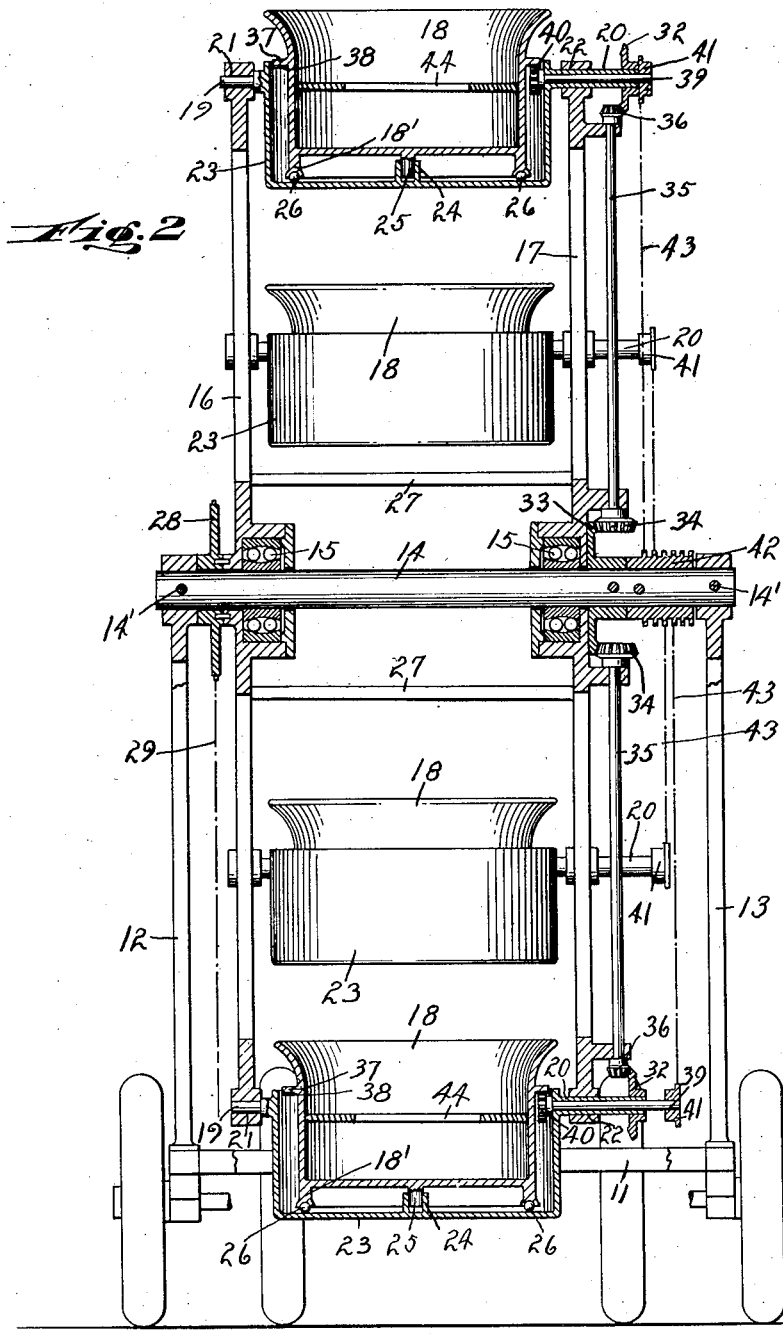
Fig. 2 is an enlarged sectional view along line 2—2 of Fig. 1 seen in the direction of the arrows.

Referring to the drawings, 10 denotes a motor vehicle such as a truck or the like, to which a trailer 11 of any known construction may be attached in well known manner.

Rigidly mounted on the trailer are two uprights 12 and 13 between which a shaft 14 extends and which is mounted in suitable journaling holes in said uprights. In the present embodiment said shaft is pinned against rotation as at 14'.

Rotatably mounted on ball bearing. supports 15 about said shaft is a frame comprising two portions 16 and 17 spaced from each other and shown in the present instant as star shaped. From between the six pairs of apexes of said frame, passenger carrying gondolas are adapted to be supported as will be presently described. Other suitable means of circularly supporting said gondolas may be employed. The star shaped sections are chosen here by way of example and not as limiting structure.

Rotatably mounted between opposite apexes of the respective frame sections by means of laterally projecting axles 19 and 20 which respectively extend into and through journalling holes 21 and 22 in said apexes are gondola supports 23 shown in the present embodiment as open topped cylinders. Any other suitable shape may be used for said supports.

Borne in said supports are the passenger carrying or holding compartments 18 of said gondolas which are adapted to rotate about the vertical axes of their respective supports. To effect this a socket 24 is provided on the bottom of each support at the center thereof into which a downwardly projecting centering spindle 25 attached to or integrally formed with the bottom of its respective compartment 18 projects. To reduce frictional loss, the bottom of each compartment is provided with a downwardly projecting annular rim 18¹, the lower end of which is grooved to receive ball bearings 26 which also contact with the inner surface of the bottom of the respective supports 23. Other suitable friction reducing means for rotatably mounting the gondola compartments in their supports may be employed.

The portions 16 and 17 of the frame may be rigidly connected together by braces 27 extending therebetween and rigidly attached to each of said frames.

Said frames may be rotated by means of a sprocket wheel 28 rigidly attached to one of said frames and mounted in rotatable manner about said shaft 14. A chain 29 connects said sprocket wheel with a second sprocket wheel 30 mounted to the trailer frame or the vehicle frame and is adapted to be driven in any convenient manner from the vehicle engine. 31 represents diagrammatically a clutch of any well known type for coupling or uncoupling the drive from the vehicle engine to sprocket wheel 30.

It is desirable to positively maintain the gondola supports 23 in horizontal position irrespective of the position of the frames. To this end, there is fixedly mounted to each of the axles 20 a bevel gear 32. Fixedly mounted on shaft 14 is a master bevel gear 33. Meshing with said master gear 33 are bevel gears 34 corresponding in number to the number of supports and each gear 34 through a spindle 35, which latter are rotatably borne on section 17 of the frame, is connected to a bevel gear 36. The latter gears mesh with their respective bevel gears 32. The gearing ratio between master gear 33, gears 32, 36 and 34 should be such that for each planetary rotation of each gear 34 about gear 33, the respective gears 32 will rotate one complete revolution. The direction of rotation of gear 32 should be opposite that of the frames about shaft 14. Thus irrespective of the position of the frames 16 and 17 the supports 23 will always remain horizontal.

It is also desirable to secure rotation of the gondola compartments 18 about the axes of their respective supports. To effect this, each gondola compartment is provided with an external annular shoulder 37 which may be provided with a rack 38.

Mounted on the inner end of a spindle 39 which is rotatably borne in each axle 20, is a pinion 40 which meshes with its respective rack 38. Fixedly mounted on each spindle 39 may be a sprocket 41. Fixedly mounted on shaft 14 is a multiple or master sprocket drum 42 having sets of teeth corresponding to the number of gondolas. A suitable chain 43 joins the respective sprocket 41 with one of the sets of teeth on the master drum 42. Thus as the frames rotate, the respective gondola compartments are rotated about the respective axes of gondola supports 23. Said axes by virtue of the continuous horizontal position of supports 23 are always vertical. The ratio between the teeth on the master sprocket drum and sprockets 41 may be anything desired, either to secure a single rotation about their vertical axes of each gondola compartment 18 for each complete rotation of the carrying frame about shaft 14 or any fractional or multiple number of rotations of said gondola compartment.

My device operates as follows:—

When clutch 31 is thrown in, the frame comprising sections 16 and 17 is rotated about the shaft 14 carrying with it supports 23 and compartments 18 of the gondolas. Supports 23 are always during this rotation positively maintained in horizontal position irrespective of the distribution of passenger weight in the gondola compartments 18 by virtue of master gear 33 and its aforementioned associated gears. At the same time compartments 18 are rotated about the vertical axes of supports 23 so that the passengers secure a panoramic view of the terrain.

To safeguard the passengers suitable protecting coverings of wire mesh or the like indicated in dotted lines may be provided over each gondola.

Likewise for the comfort of the passengers, a seat 44 may be arranged as desired in each of the gondolas.

There are many modifications which may be made in structural details of my invention without departing from the spirit thereof and I do not wish to be limited to the details shown and described.

What I claim is:—

1. An amusement device in form of a Ferris wheel, comprising a main horizontal shaft, a circular series of interconnected gondolas mounted to revolve about said shaft and means between said shaft and said gondolas to impart to said individual gondolas rotation in vertical direction so as to retain them in horizontal position while they rotate around said shaft.

2. An amusement device as per claim 1, in which the series of gondolas are each provided with horizontal shafts supported about said main shaft to revolve together around the axis of said main shaft, and are individually rotated in the reverse direction to the direction of rotation about said main shaft, so that their angular speed at all times corresponds with the angular speed of rotation about said main shaft.

3. An amusement device as per claim 1, in which the means for individually rotating said shafts of the gondola are propelled from means on said main shaft.

4. An amusement device as per claim 1, in which each gondola comprises an outer part and an inner part having a seat and constituting the gondola proper, said inner part being mounted in said outer part to be capable of turning upon its own vertical central axis.

5. An amusement device as per claim 1, in which each gondola comprises an outer part having shafts revolubly supported on and impelled from means on said main shaft to turn in a reverse direction and with the angular speed of rotation of said gondolas about said main shaft and an inner part constituting the gondola proper revolubly borne in said outer part and impelled from means on said main shaft to turn around its own vertical central axis.

6. An amusement device comprising a horizontal shaft, a frame rotatably mounted on said shaft, means to turn the same, a circular series of supports rotatively borne in said frame, means for imparting rotary motion to said supports from means on said main shaft in the reverse direction to and with the angular speed of said frame, a gondola revolubly borne in each of said supports and means for imparting rotation to each gondola around its own central vertical axis from means on said main shaft.

7. An amusement device comprising a chassis, a horizontal shaft borne in said chassis, a frame rotatably mounted on said shaft to turn about the latter, a circular series of supports rotatively in said frame, means for imparting rotary motion to said supports from said main shaft in the reverse direction thereto and with the angular speed of said frame about said main shaft, a gondola revolubly borne in each of said supports and means for imparting rotation to each gondola around its own vertical central axis from said main shaft.

8. In an amusement device in form of a Ferris wheel, a horizontally mounted shaft, a frame mounted on said shaft to turn about the latter, a circular series of supports rotatively borne on said frame, means for imparting rotary motion to said supports from said main shaft in the reverse direction thereto and with the angular speed of said frame about main shaft, a gondola revolubly borne in each of said supports, means for imparting rotation to each gondola around its own vertical central axis from said main shaft, said gondola having an independently rotatable seat.

9. In an amusement device in form of a Ferris wheel, a horizontally mounted shaft, a frame mounted on said shaft to revolve about the latter and capable of being so revolved by the motor of said vehicle, a circular series of supports rotatively borne in said frame, means for transmitting motion to said supports in the reverse direction to and with the angular speed of rotation of said frame about said main shaft, a gondola revolubly borne in each of said supports, means for transmitting rotation to each gondola around its own vertical central axis from said main shaft, said gondola having an independently rotatable seat, and means for imparting independent rotation to said seat.

In testimony whereof, I affix my signature.

JULIUS BAER.